United States Patent [19]

Kessler

[11] 4,004,064

[45] Jan. 18, 1977

[54] PROTECTIVE COATING FOR ARTICLES

[75] Inventor: Saul Kessler, Canoga Park, Calif.

[73] Assignee: Joseph W. Aidlin, Los Angeles, Calif.

[22] Filed: May 22, 1975

[21] Appl. No.: 579,777

Related U.S. Application Data

[60] Division of Ser. No. 429,911, Jan. 2, 1974, which is a continuation-in-part of Ser. No. 137,429, April 26, 1971, abandoned.

[52] U.S. Cl. .......................... 428/421; 260/429.5; 260/448 R; 428/411; 428/457; 428/469

[51] Int. Cl.² .................... B32B 9/04; B32B 27/00

[58] Field of Search ..... 260/429.5, 448 R, 606.5 B; 428/421

[56] References Cited

OTHER PUBLICATIONS

Blackborow et al. Thermal Elimination of Hydrogen Chloride from Adducts of Aromatic Amines, Jour. Chem. Soc. A1971, pp. 49–53.

Navar et al. Tetrachloro bis(pentafluoroanaline) Titanium (IV) Chemistry & Industry (London) (1963) p. 613.

Blay et al. "Boron Hydride Derv." Journ. Chem. Soc. (1962) pp. 3416–3424.

Cridina et al. Behavior of Organic Esters of Boron with Fluoroalkylaryl Radicals, 2h Obshch Khium 32 (1962) p. 323.

*Primary Examiner*—George F. Lesmes
*Assistant Examiner*—R. J. Roche
*Attorney, Agent, or Firm*—Marvin E. Jacobs

[57] ABSTRACT

A protective coating for articles, and particularly titanium, is disclosed. The coating material comprises a combination of a metal halide and a fluorohydrocarbon amine. The surface of the article is preferably preliminarily cleaned by physical and/or chemical techniques, and is treated with a chemical conversion coating agent to provide an inert, microporous surface. The treated surface is then impregnated with the coating material to provide a low friction, protective surface.

18 Claims, 2 Drawing Figures

PROTECTIVE COATING FOR ARTICLES

CROSS REFERENCE TO RELATED APPLICATIONS

The present application is a division of application Ser. No. 429,911, filed Jan. 2, 1974, which in turn is a continuation-in-part of application Ser. No. 137,429, filed Apr. 26, 1971, now abandoned.

BACKGROUND OF THE INVENTION

1. Field of the Invention

The present invention relates to the protective coating of articles and, more particularly, to a protective lubricant for metal bodies made of titanium and titanium alloys.

2. Description of the Prior Art

It is necessary to protectively coat titanium articles to lubricate surfaces subject to bearing or friction forces. Furthermore, titanium surfaces in contact at room temperature must be prevented from cold welding. Improved coating materials are needed since titanium is being considered increasingly for applications in the aircraft, aerospace, automotive and marine fields.

Titanium has been protectively coated by anodizing treatments, graphite containing coatings, molybdenum sulfide coatings in various vehicles and tallow. These treatments have not been satisfactory under various conditions of service and have been found to interfere with subsequent fabrication techniques. During fabrication, the coating must withstand temperatures of 500° F or more during welding or bending operations. The coating must be coherent and adherent to the surface so that it can withstand abrasion forces encountered during handling, fabrication and service.

The coatings prior to this invention have been found to vaporize and fume in high temperature environments and to lose their effectiveness in short periods of service by running off the surface liquid form or abrading from the surface in objectionable dust form. Furthermore, welding was impractical unless special joining procedures were practiced. Also, the surface appearance was unattractive due to staining and wetting. Moreover, a protective coating was difficult to apply without changing the dimensional tolerances of metal articles.

SUMMARY OF THE INVENTION

An improved coating material for protective coating of surfaces is provided by the present invention which is not subject to the disadvantages or limitations of the previous materials and provides dramatic improvement in performance characteristics. The coating material of the invention provides a surface with a very low coefficient of friction and can be subjected to high temperature without deterioration, or fuming, thus avoiding developing obnoxious and polluting vapors.

The protective coating of the invention remains in a solid or semi-solid state adherent and coherent during handling, fabrication or service at low or high temperature and, therefore, does not leak oily liquids to aqueous environments or generate particulates or dust to contribute to atmospheric contamination.

The continuity of the protective film under varied conditions assures corrosion prevention and the film exhibits a pleasing initial appearance and improved resistance to staining or wetting. Weldability can be practiced by conventional techniques and abrasion resistance by unidirectional or oscillatory motion is enhanced as compared to previous materials.

These and many other attendant advantages of the invention will become apparent as the description proceeds.

The improved coating material according to the invention comprises a combination of a metal halide and a polyfluoroalkene amine. The material is applied to the surface usually after a preliminary cleaning treatment and a surface roughening preferably affected by etching or chemical conversion coating. After excess coating material is removed, the article is ready for further fabrication or service. The coating material can be applied directly to the surface from a liquid suspension or from the gas phase.

The invention will now become better understood by reference to the following detailed description when considered in conjunction with the accompanying drawings.

DESCRIPTION OF THE PREFERRED EMBODIMENTS

Figure 1:
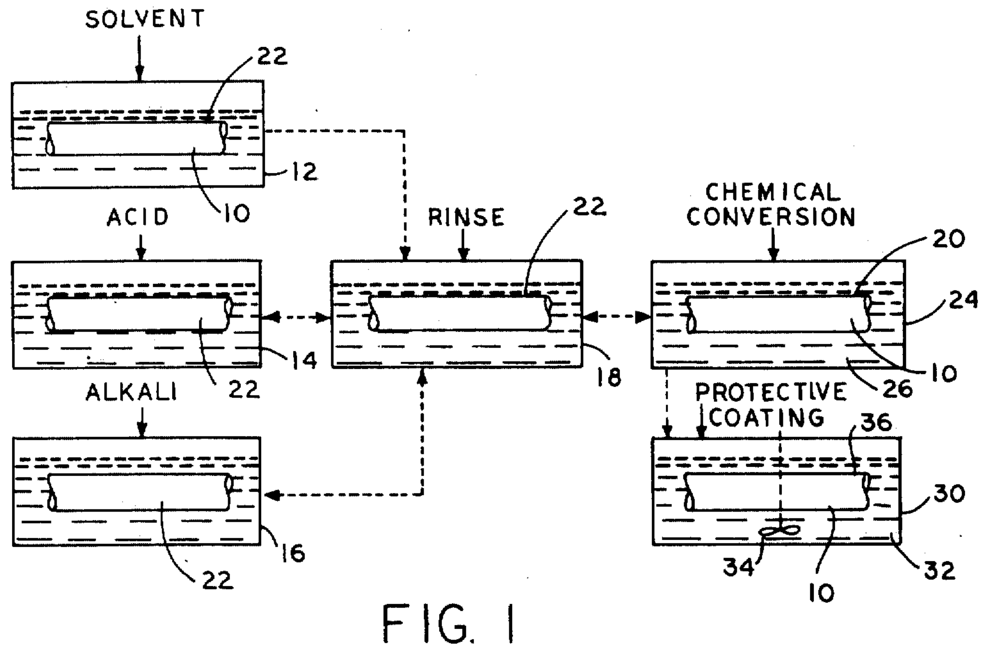
FIG. 1 is a schematic view of processing steps for forming a protective coated article according to the invention.

The particular description which follows relates to the treatment of titanium articles, one of the most difficult metals to lubricate, but, obviously, the treatment is applicable to other metal surfaces such as aluminum, tin, copper, zinc or chromium, iron or alloys thereof. The coating can be applied to diverse substrates for lubrication or environmental protection such as wood, paper, plastic or ceramic articles in filament, sheet, rod or powder form.

Commercial titanium alloys generally contain at least 90% by weight of titanium and minor amounts of other alloying metals such as up to 4% or more of vanadium. Commercially pure titanium alloy A-70 has the following nominal composition:

| Element | WT. % |
|---|---|
| C | 0.08 |
| Fe | 0.40 |
| N | 0.05 |
| H | 0.15 |
| Ti | Balance |

The coating material is formed from a combination of ingredients which react to form a fluoro, chloro, bromo or iodo, waxy hydrocarbon-amine lubricating material capable of forming a coherent and adherent film on the surface of the article.

The first ingredient utilized in forming the material is a compound of fluorine, bromine, iodine or chlorine, and a metal such as boron, aluminum or titanium. A preferred material is boron trifluoride and especially in a stabilized form as a complex with an ether such as diethyl ether.

The other necessary ingredient is a fluorinated hydrocarbon having a relatively high content of available and active fluorine atoms which is reactive with the metal halide. Preferred materials are fluoroalkyl-aryl compounds selected from those of the formula:

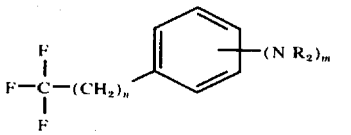

wherein *n* is an integer from 0 to 4, *m* is an integer from 0–2 and R is selected from hydrogen, lower alkyl of 1–9 carbon atoms, lower alkanol of 1–8 carbon atoms and aryl such as phenyl or aralkyl such as benzyl. A suitable material is $\alpha,\alpha,\alpha$,-trifluoro-m-toluidine. The presence of an amino group is believed to relieve stress in the deposited film in a manner analogous to the action exhibited by sulfonamides in electrodeposition or anodizing of aluminum.

The metal halide and fluorinated hydrocarbon can be reacted in bulk, in solution or suspension in a fluid in liquid or gas phase. In the gas phase reaction, the fluorinated hydrocarbon in a liquid carrier is first coated onto the surface to be treated. The metal halide as a vapor is then applied to the coated surface and reacts in situ with the fluorinated hydrocarbon to form an adherent, waxy, protective layer, preferably as a monomolecular epitaxial layer.

The waxy protective material may be preformed and applied to the surface. The reaction is preferably carried out in an organic liquid diluent or solvent, preferably having a boiling point above 100° C. Higher molecular weight products are formed in the liquid carrier and a suspension is formed which can readily be applied to the surface to be treated.

Suitable diluents are polychloro substitued unsaturated aliphatic compounds such as trichloroethylene, carbon tetrachloride, tetrachloroethylene, difluoro-dichloro-ethylene, fluoro-trichloroethylene or other terminally halogenated alkenes of 1–8 carbon atoms. For purposes of reactivity during forming the coating material and for inertness and temperature resistance of the material, the compound is preferably substituted with chlorine on the carbon atoms adjacent the unsaturation, such as tetrachloroethylene.

The ratio of the ingredients can be varied within wide limits depending on the hardness and other desired characteristics of the film and the economics of maximizing yield. Since the diluent, such as tetrachloroethylene, is readily available at low cost, it can predominate in the reaction mixture. Satisfactory yields are obtained by including minor amounts of from 1–20 parts and preferably about 2–5 parts by volume of the other ingredients. Though the order of addition is not critical, it is preferable to first form a mixture of the diluent and fluorinated hydrocarbon before adding the metal halide.

A specific example follows:

EXAMPLE 1

A coating was prepared from the following ingredients:

| Component | Amount |
|---|---|
| Tetrachloroethylene $Cl_2C{=}CCl_2$ | 900–960 ml |
| Boron trifluoride etherate $(C_2H_5)_2O.BF_3$ | 50–20 ml |
| $\alpha,\alpha,\alpha$,-trifluoro-m-toluidine ($C_7H_6F_3N$) | 50–20 ml |

The toluidine and tetrachloroethylene were combined and a cloudy suspension was formed. When the metal halide etherate was added, globules of a fluffy, waxlike, white precipitate was observed in copious volume after storage at room temperature. A maximum volume of waxlike solid over ½ the initial volume of the mixture was obtained after several days. The reaction could be accelerated by heating the mixture to a higher temperature. The waxlike material was heated to 575° F and no decomposition or melting of the material was observed. Since the formation of a waxy solid is observed, a chloro-fluoro-boro substituted hydrocarbon polymer is believed to be formed.

EXAMPLE 2

Trichloroethylene was substituted for the tetrachloroethylene of Example 1. A fluffy, waxlike, gelatinous, lightly colored reaction product was formed.

EXAMPLE 3

Carbon tetrachloride was substituted for the tetrachloroethylene of Example 1. A product similar to that of Example 2 was formed.

EXAMPLE 4

When the tetrachloroethylene was eliminated, a more vigorous and exothermic reaction occurred and a more solid reaction product was recovered.

EXAMPLE 5

An equivalent amount of $BBR_3$ liquid was substituted for the $BF_3$ etherate of Example 1. The yield was almost doubled, the reaction product was more soluble in organic solvent and the suspension in the liquid carrier was more uniform and stable.

EXAMPLE 6

An equal amount by weight of $BI_3$ crystals were substituted for the $BF_3$ etherate of Example 1. The reaction product was less soluble in organic solvent and separated out as individual hard particles in lower yield. The product was more soluble in water.

EXAMPLE 7

A standard cold-rolled, carbon steel tube specimen was pretreated by cleaning as described in FIG. 1. The coating composition of Example 1 was applied to the treated surface by dipping and then rinsed in water. An adherent, lubricating, protective film was provided.

EXAMPLE 8

30¾ × 1 inch cylindrical specimens of titanium articles pretreated with the composition of Example 1 were placed in an aqueous saline solution along with 15 untreated specimens. The saline was heated to 500° F for 200 hours and 750° F for 50 hours. The treated specimens exhibited excellent corrosion resistance showing no discoloration and some minor shallow and diffuse pitting on some specimens. There was some weight loss of the coating on the treated specimens. Unexpectedly, the untreated specimens showed some initial pitting but then exhibited weight gain due to the transference and reaction with coating composition emanating from the treated specimens. Thus, the coating composition of the invention may be utilized to treat surfaces in situ by dispersion in a liquid medium.

The material can be applied to the surface to be protected by dipping, brushing, spraying, tumbling, electrophoresis or by forming the material in situ by separate application of liquid ingredients or gaseous infusion of vaporous ingredients to the substrate. When the ingredients were combined in the presence of the surface to be treated, such as the conversion coated surfaces described in Table I, an accelerated reaction was observed and the yield of waxlike precipitate was substantially increased.

Referring now to FIG. 1, a generalized sequence of steps for protectively coating a substrate is illustrated. The metal article 10, such as a commercially pure titanium cylinder 6 inches in diameter, 35 inches long and having a 0.028 inch wall thickness, is initially thoroughly cleaned. Typically, the article is subjected to a plurality of successive cleaning treatments in organic solvent, acid, and alkali in tanks 12, 14 and 16 with intermediate and final water rinses in rinse tank 18.

The solvent is typically trichloroethylene in the vapor phase at its boiling point. The acid is suitably a non-aggressive acid such as phosphoric acid optionally containing some chromic acid and the alkali comprises a non-aggressive alkali such as trisodium-phosphate or carbonate buffered sodium hydroxide.

Methods of application of these pre-treatment steps may be by brush, spray, dip and/or gaseous infusion at a temperature necessary to promote complete removal of all organic and inorganic contaminants. Various forms of energy such as mechanical agitation, ultrasonic radiation, superimposed electrical potentials, or combinations of the above may be employed in any of the operations. For purposes of illustration, the article 10 is shown as being subjected to various cleansing agents and rinsing by immersion.

The chemically cleaned titanium article 10 is then treated under conditions to form a microporous, roughened surface 22. Preferably a microporous chemical conversion coating 20 is formed to convert the titanium surface into a titanium compound, absent free titanium metal. The treatment is effectedly subjecting the article to an aqueous chemical conversion coating solution 26 in tank 24. This provides a better substrate for receiving and retaining the subsequently applied lubricant since the conversion layer is softer, microporous, more inert, chemically stable, non-reactive and more corrosion resistant than the untreated surface 22. Furthermore, conversion coated surfaces exhibit uniformly pleasing color.

The depth of penetration should be controlled since it is important to control and minimize dimensional change of parts having a narrow tolerance. A penetration of at least 0.01 mil will provide sufficient depth to retain enough coating material for lubrication and protection of the surfaces and usually penetration of over 1 mil should be avoided. Typically, about 0.5 mil penetration is very effective. No dimensional growth or change is achieved by this treatment, but simply formation of a chemically converted, thin microporous zone extending inward from the original surface to a penetration depth of about 0.5 mil.

The conversion coating solutions generally contain a mixed salt complex formed from a Group I or Group II metal salt of a reactive anion such as phosphate, borate or chromate, a Group I or Group II metal halide and an acid, typically a hydrohalic acid. Typical bath compositions and conditions for treating titanium are presented in the following table.

TABLE I

| BATH | BATH COMPOSITION GRAMS PER LITER | TEMPERATURE ° F | pH | IMMERSION TIME, MIN |
|---|---|---|---|---|
| 1 | 50 $Na_3PO_4.12H_20$<br>20 $KF.2H_20$<br>11.5 HF solution | 185 | 5.1 to 5.2 | 10 |
| 2 | 50 $Na_3PO_4.12H_20$<br>20 $KF.2H_20$<br>26 HF solution | 80 | <1.0 | 1 to 2 |
| 3 | 40 $Na_2B_40_7.10H_20$<br>18 $KF.2H_20$<br>16 HF solution | 185 | 6.3 to 6.6 | 20 |

Sufficient deionized water was added in each case to adjust the volume to 1 liter. The HF solution was a commercial 50.3 weight percent solution.

The conversion coatings from the bath compositions tabulated above are believed to primarily contain $TiF_4$, KF, TiP and $K_3PO_4$.

The conversion coated article is then dried and placed in a tank 30 containing the lubricant coating material 32 of Example 1 for about 30 seconds at 25° C with moderate agitation from a blade mixer 34. On removal, a whitish film 36 adhered to the titanium surface. The film was rubbed with clear cheesecloth for about one minute until no apparent evidence of the film remained on the surface. The surface coefficient of friction was dramatically lowered by the transparent lubricant film.

Figure 2:
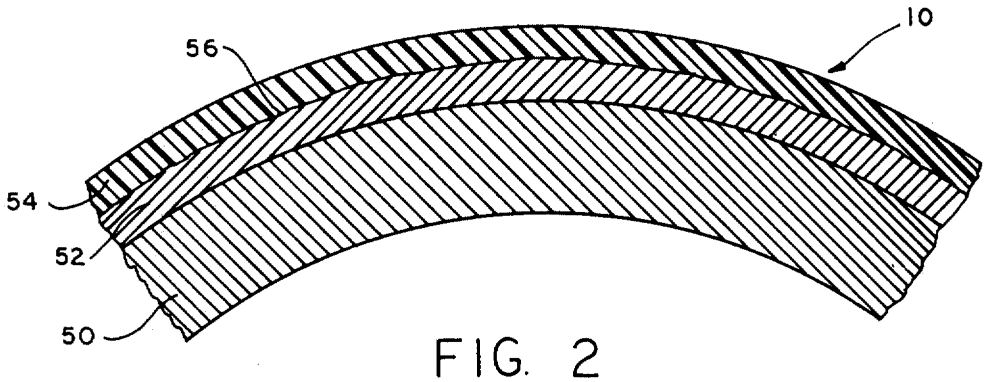
FIG. 2 is an enlarged cross-sectional view of the wall of a tubing article treated in accordance with the invention.

Referring now to FIG. 2, the finished tube 10 includes a base metal substrate 50 having a microporous chemically converted outer surface layer 52 and a transparent lubricant film 54 penetrated into the pores 56 of the layer 52 and forming an outer protective, lubricating film 54 extending over the layer 52.

The treated tube was heated to more than 500° F and smoothly bent over a toll steel mandrel to form 90° elbows without rupturing of the film 54. All other known lubricants for titanium have proven unsucessful when subjected to the same deformation operation. Welding through the lubricant coating is convenient without any special changes in welding procedure.

The coating of the invention is also particularly adapted for use in corrosive environments such as coating titanium marine propeller blades and fasteners which otherwise would cold weld.

Another convincing demonstration of the excellent lubrication qualities of the coatings on titanium was with a commercially pure titanium nut and bolt. The bare nut turned very freely on the coated threads of the bolt. Many hundreds of repeated tightening and loosening cycles of this standard common threaded nut and bolt have not changed the easy, low-friction movement of this test fastener. Previous lubricants or protectants required treatment of both mating surfaces, whereas the coating of the invention exhibits better performance when only one of the mating surfaces is treated. Contrast should be made with the data for repetitive tightening and loosening of titanium nuts and bolts of only 15–100 with the best of the previously known lubricants.

The coating can be removed if desired by physical means such as directing a stream of abrasive at the coated surface or with strong solvents such as a room temperature mixture of HF and $HNO_3$. The surface properties of the coating can be modified by applying a secondary lubricant film thereto such as molybdenum disulfide or graphite.

It is to be understood that only preferred embodiments of the invention have been described and that numerous substitutions, modifications and alterations are all permissible without departing from the spirit and scope of the invention as defined in the following claims.

What is claimed is:

1. A protectively coated article comprising in combination:

a metal substrate; and a low-friction waxy, continuous, coherent film having a decomposition temperature of at least 575° F adherent to a surface of said substrate comprising the reaction product of a chloride, bromide or iodide of a metal selected from aluminum, boron or titanium and a mononuclear -arylamine containing an alkyl group containing from 1–5 carbon atoms and having three fluorine atoms attached to the terminal carbon atom.

2. An article according to claim 1 in which the metal surface comprises titanium.

3. An article according to claim 2 in which the film is in the form of an epitaxial deposit.

4. An article in accordance with claim 1 in which said surface contains a microporous, roughened layer beneath said film.

5. An article in accordance with claim 4 in which said layer comprises chemically converted salts of titanium.

6. An article in accordance with claim 5 in which said layer is no more than 1 mil in thickness and said mixture comprises the reaction product of tetrachloroethylene and 1 to 50 parts by volume of each of boron-trifluoride etherate and $\alpha,\alpha,\alpha$,-trifluoro-m-toluidine.

7. An article according to claim 1 in which the substrate layer comprises aluminum.

8. An article according to claim 1 in which the arylamine is selected from compounds of the formula:

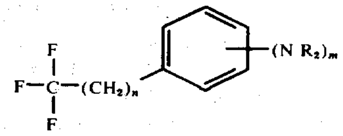

where n is an integer from 0 to 4, m is an integer from 1–2 and R is selected from hydrogen, lower alkyl of 1–9 carbon atoms, lower alkanol of 1–8 carbon atoms, phenyl or benzyl.

9. A method of protectively coating the surface of a metal article comprising applying to said surface a continuous, adherent, coherent, waxy film having a decomposition temperature of at least 575° F, said film being the reaction product of:

a fluoride, chloride, bromide or iodide of a metal selected from aluminum, boron, or titanium; and a mononuclear - arylamine containing alkyl group containing from 1–5 carbon atoms and having three fluorine atoms attached to the terminal carbon atom.

10. A method according to claim 9 further including the step of thoroughly cleaning the surface and forming a microporous, roughened surface layer before applying said mixture to the surface.

11. A method according to claim 10 in which the depth of said layer is not more than 1 mil.

12. A method according to claim 10 in which the microporous, roughened layer is formed by subjecting the surface to a chemical conversion coating solution.

13. A method according to claim 12 in which the metal surface essentially comprises titanium and said conversion coating solution contains an acid, a Group I or II metal halide and a Group I or II metal salt of a reactive anion selected from the group consisting of phosphate, borate and chromate.

14. A method according to claim 9 further comprising the step of reacting said metal halide and said mononuclear arylamine in situ in the presence of said metal surface.

15. A method according to claim 14 in which said reaction is conducted in the gas phase in the presence of said surface.

16. A method according to claim 14 in which the surface is immersed in a body of diluent for the reactants during said in situ reaction.

17. A method according to claim 9 further including the step of combining a polychloro-organic with said mononuclear-arylamine and then adding said metal halide to form a waxlike material.

18. A method according to claim 9 in which the arylamine is selected from compounds of the formula:

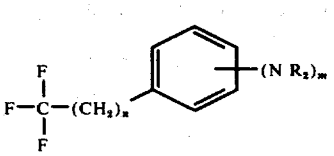

where *n* is an integer from 0 to 4, *m* is an integer from 1–2 and R is selected from hydrogen, lower alkyl of 1–9 carbon atoms, lower alkanol of 1–8 carbon atoms, phenyl or benzyl.

* * * * *